(No Model.) 2 Sheets—Sheet 2.
F. J. DRAKE.
SAW SETTING MACHINE.
No. 482,624. Patented Sept. 13, 1892.
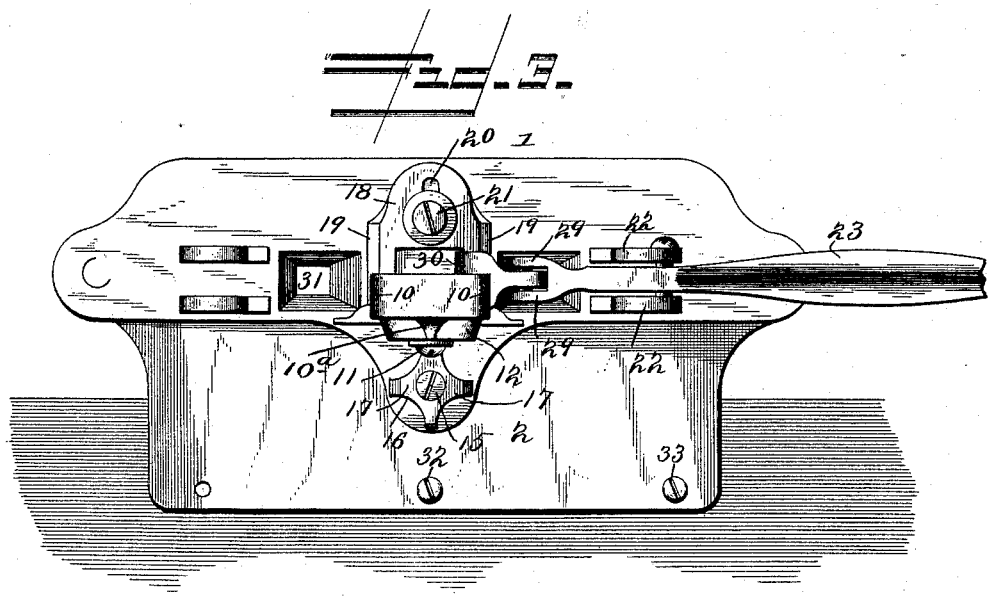
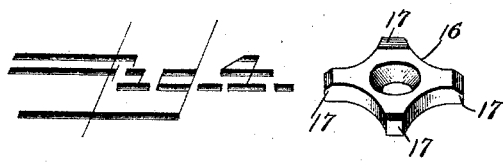
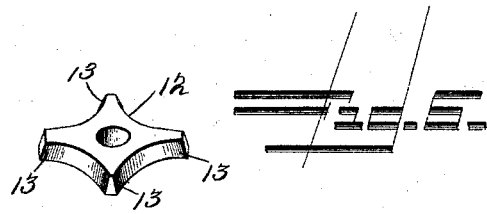
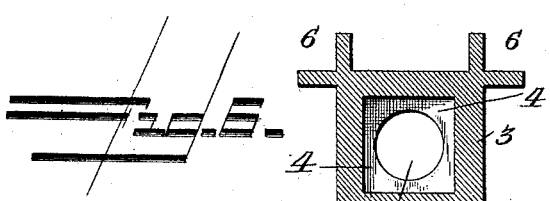
WITNESSES: INVENTOR:
F. L. Ourand Francis J. Drake
W. L. Coombs By Sauis Bagger & Co
Attorneys.

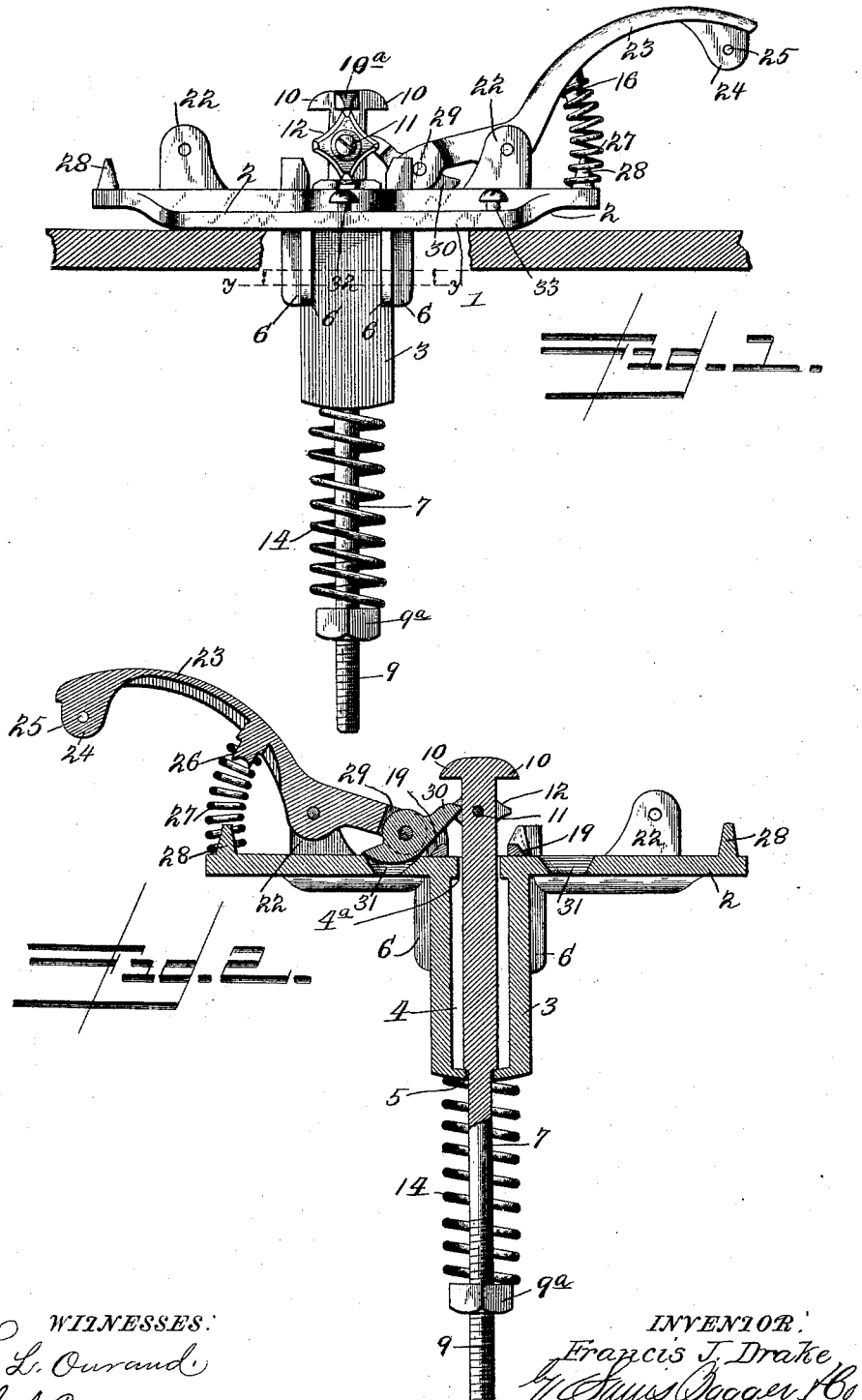

UNITED STATES PATENT OFFICE.

FRANCIS JAMES DRAKE, OF BELLEVILLE, CANADA.

SAW-SETTING MACHINE.

SPECIFICATION forming part of Letters Patent No. 482,624, dated September 13, 1892.

Application filed January 30, 1892. Serial No. 419,811. (No model.) Patented in Canada November 18, 1891, No. 37,804.

*To all whom it may concern:*

Be it known that I, FRANCIS JAMES DRAKE, a subject of the Queen of Great Britain, and a resident of Belleville, in the Province of Ontario and Dominion of Canada, have invented certain new and useful Improvements in Saw-Setting Machines, (for which I have obtained Letters Patent in the Dominion of Canada, No. 37,804, dated November 18,1891;) and I do hereby declare that the following is a full, clear, and exact description of the invention, which will enable others skilled in the art to which it appertains to make and use the same, reference being had to the accompanying drawings, which form a part of this specification.

My invention relates to saw-setting machines, by means of which the teeth of a saw may be set or bent outward at an angle to the blade to prevent the latter from being bound by the wood while passing through a cut.

The object of the invention is to provide an improved construction of machines of the above character, whereby the teeth of a saw may be set in an expeditious, efficient, and accurate manner, so that one tooth will not project more than another and thereby make uneven work.

The invention consists in the novel construction and combination of parts hereinafter fully described and claimed.

In the accompanying drawings, Figure 1 is a front elevation of a saw-setting machine constructed according to my invention. Fig. 2 is a central longitudinal section of the same. Fig. 3 is a plan view. Figs. 4 and 5 are perspective views, respectively, of the anvil and hammer. Fig. 6 is a horizontal section of the boss on the line $y$ $y$, Fig. 1.

In the said drawings the reference-numeral 1 designates the frame of the device, consisting of the plate 2, having a downwardly-depending central boss 3, having an angular recess 4 and an angular aperture $4^a$ in its upper part and a circular intersecting aperture 5 in its lower end. The plate 2 and the boss 3 are made integral, and at each corner the boss is formed with downwardly-depending wings 6, which serve as strengthening-braces.

Reciprocating vertically in the boss is a plunger 7, having its lower end 8 cylindrical in form and provided with screw-threads 9 to receive an adjusting-nut $9^a$. The upper portion of the plunger is square or angular, to correspond with the aperture $4^a$ in the boss, whereby said plunger, which projects above the plate 2, is prevented from rotating. The upper end of the plunger is provided at its front with a projection $10^a$ and at its sides with a lateral projection 10, for a purpose hereinafter described.

Adjustably secured to the plunger near its upper end by a set-screw 11 is a striker or hammer 12, having a number of beveled striking heads or faces 13 of varying sizes, so as to adapt them for use with saw-teeth of different sizes.

The numeral 14 denotes a coiled spring interposed between the nut 10 and the lower end of the boss, and by means of said nut its tension can be regulated.

Secured to the plate 2 by means of a set-screw 15, so as to be rotatable or adjustable thereon, is an anvil 16, having a series of radial arms 17 of varying sizes, with their outer ends beveled so as to correspond with the hammer-heads 13. This anvil is located directly in front of the plunger, so that as the latter is depressed the beveled hammer-head will strike squarely therein.

The numeral 18 denotes a guide having two forwardly-projecting arms 19, one upon each side of the plunger, and at its rear is provided with an elongated slot 20, by which it is adjustably secured to the plate 2 by means of a set-screw 21.

Near each end of the plate 2 are formed upwardly-extending lugs 22, in which is adapted to be pivoted a lever 23, having a lug 24 near its outer end, with an aperture 25 to receive a wire or rod, by which it may be connected with a treadle when it is desired to be worked by foot-power. Intermediate of its pivotal point and outer end the lever is provided with a cone 26, with which engages a coiled spring 27, also engaging with a cone 28. There is one of these cones 28 at each end of the plate 2. The inner end of lever 23 is bifurcated, forming lugs 29, in which is pivoted a curved dog 30, adapted to engage with the side projections 10 of the plunger when said lever is depressed and elevate the plunger. Intermediate of the plunger and the lugs 22 are beveled slots 31, with which the lower end of the dog 30 engages when the lever is elevated or in normal position.

Located in front of and in line with the anvil is a set-screw 32, by which the inclination or angle to be given to a tooth is regulated.

At each end of the plate and in line with screw 32 is a screw-threaded aperture to receive a screw 33, which aids in supporting the saw.

It will be noted that the lugs 22, cones 28, and slot 31 are identically the same on each side of plate 1, so that the device may be used as a right or left hand machine by simply changing the lever from one side to the other.

The operation is as follows: The device is secured in a vise or to a board or to other object and the hammer 12 and anvil 16 are secured in proper position, with the beveled striking head and face corresponding with the size of the tooth to be set, in alignment with each other. It will be seen that the upper striking-head of the hammer abuts against the under side of the projection 10ª, so as to partly relieve the set-screw 11 of the force of the blow when the hammer strikes the anvil. The saw is held in both hands with the blade resting on the regulating-screw 32, which is adjusted, so as to give the proper inclination to the tooth, by elevating or depressing the same. If it is desired to give very little set to the tooth, the said screw is turned up, elevating the back of the saw, and consequently depressing the teeth which lie on the beveled face of the anvil. If more set is desired, the screw is turned down, depressing the back of the saw and elevating the teeth, as will be obvious. The lever is now depressed, either by hand or foot power, when the pivoted dog will be elevated and engaging with one of the projections 10 will elevate the plunger a certain distance, when it will slide past said projection, releasing the plunger, which will be forced down by spring 14, and the hammer-head will strike and set the tooth lying on the anvil, the force of the blow being regulated by the nut 9ª, by turning which up or down increases or decreases the tension of the spring. When the pressure upon the lever is relieved, it will be returned to normal position by the coiled spring 27 and the lower end of the dog 30 striking the beveled sides of the slot 31, it will be again turned into position to engage with the projection of the plunger when the lever is depressed to set another tooth. The screw 33 serves to aid in supporting the tooth while the teeth are being set.

The lever may be operated by hand or foot power, as found most convenient or desirable. In the latter instance a wire or rod is connected with the lug on the outer end of the lever and with a treadle, as will be obvious.

Having thus described my invention, what I claim is—

1. In a saw-setting machine, the combination, with the plate and the boss formed integral or in one piece, said plate being provided with apertures and upwardly-projecting lugs at each side, of the removable and reversible lever provided with a pivoted pawl and the vertically-reciprocating plunger having lateral projections with which said pawl is adapted to engage to elevate the plunger, substantially as described.

2. In a saw-setting machine, the combination, with the plate and the boss formed integral therewith, having an angular recess at its upper end and a cylindrical aperture at its lower end, of the plunger having a square upper part with lateral projections at its side and a projection at its front, an adjustable hammer having a series of radial heads adapted to abut against the projection on the front of the plunger, a cylindrical screw-threaded lower end, a coiled spring and a regulating-nut, and the lever and pivoted dog for elevating the plunger, substantially as described.

3. In a saw-setting machine, the combination of the plate, the boss formed integral therewith, the spring-actuated reciprocating plunger within said boss, having a projection upon its upper front end, the adjustable hammer having a series of beveled striking-heads, and means, substantially as described, for reciprocating said plunger.

4. In a saw-setting machine, the combination, with the plate and the boss, the spring-actuated plunger having front and lateral projections at its upper end, the adjustable hammer having a series of beveled striking-heads adapted to abut against said front projection, the adjustable anvil having a series of arms with beveled faces, and the set-screw for adjusting the inclination of the saw, of the pivoted lever having a pivoted dog adapted to engage with the lateral projections to elevate the plunger, substantially as described.

5. In a saw-setting machine, the combination, with the plate and boss and the spring-actuated plunger, of the cones at each end of said plate, the lugs intermediate thereof and the plunger, the reversible lever adapted to be pivoted in said lugs, the cone formed thereon, the adjustable guide provided with forwardly-projecting arms, and the coiled spring engaging with said cones, substantially as described.

6. In a saw-setting machine, the combination, with the plate having a boss, upwardly-extending lugs, cones at each end, and slots with beveled sides intermediate of the lugs and boss, of the spring-actuated plunger, the lever having the pivoted dog, the cone, the lug at the outer end with a transverse slot, and the coiled spring engaging with the cones, substantially as described.

In testimony that I claim the foregoing as my own I have hereunto affixed my signature in presence of two witnesses.

FRANCIS JAMES DRAKE.

Witnesses:
R. S. SILLS,
F. G. LEWIS.